July 2, 1968 B. HAYDEN 3,390,706
ADJUSTABLE CONNECTOR FOR DOBBY CORD
Filed Feb. 20, 1967

INVENTOR.
BOYD HAYDEN
BY
Morse, Altman & Oates
ATTORNEYS

United States Patent Office 3,390,706
Patented July 2, 1968

3,390,706
ADJUSTABLE CONNECTOR FOR DOBBY CORD
Boyd Hayden, Newtonville, Mass.
(452 Pleasant St., Watertown, Mass. 02172)
Filed Feb. 20, 1967, Ser. No. 617,403
2 Claims. (Cl. 139—88)

ABSTRACT OF THE DISCLOSURE

A link connecting a dobby cord to a harness frame in a loom has a threaded stem on which a nut rotates to adjust the length of the link. To prevent rotation of the nut during operation of the machine, a washer is provided with bosses which engage in recesses in an end of the nut, a spring behind the washer pressing it against the end of the nut. The washer has lateral extensions which are notched to receive ribs on the body of the link to prevent the washer from turning.

---

Figure 1:
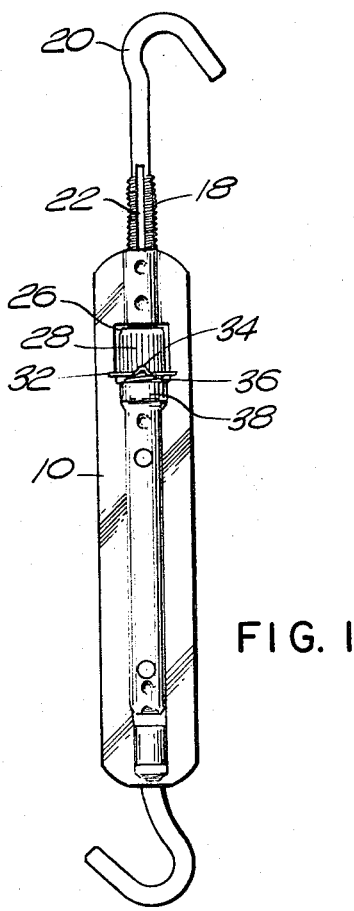

The invention relates to a link or connector for dobby cords to connect them to harness frames in a loom. As occasional adjustments of the total length of a dobby cord are required in practice, the connector is made adjustable as to length. It is an object of the invention to provide a connector which can readily be adjusted as to length without the use of a tool but which will not be affected by the severe vibrations of the loom when in use. For this purpose the connector is made with an elongated body having a longitudinal bore extending in from an end thereof. A hook or eye with a screw-threaded shank is axially movable but not rotatable in said bore. The bore is intersected by a transverse aperture in which is located a nut in threaded engagement with said shank. The violent jerking and jarring to which a dobby cord and its connections are subjected when a loom is in operation tend to cause the nut to turn on the shank which would change the overall length of the connector. As this must be prevented, an object of the invention is to provide a detent device that will permit ready rotation of the nut by the fingers of the operator but will otherwise prevent rotation of the nut. As hereinafter described this is done by providing a washer with bosses on it to engage in notches in an end of the nut, means for preventing rotation of the washer, and a spring pressing the washer resiliently against the end of the nut. A connector embodying the invention is illustrated on the drawing, of which—

Figure 2:
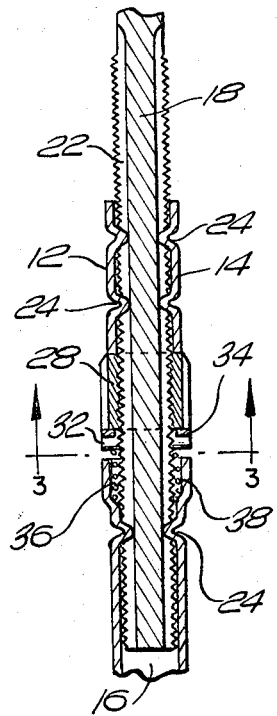
Figure 3:
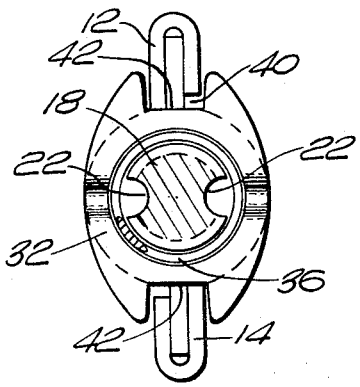
Figure 4:
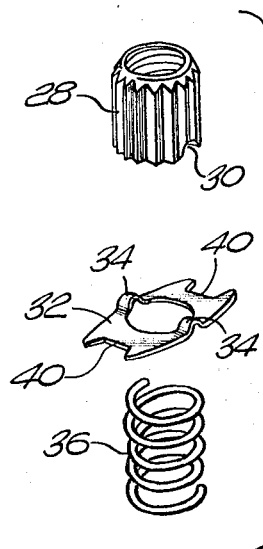

FIGURE 1 is an elevational view of a connector;
FIGURE 2 is a fragmentary section of the same on a longitudinal plane and on a larger scale;
FIGURE 3 is a section on the line 3—3 of FIGURE 2, on a still larger scale; and
FIGURE 4 is an exploded view of the nut, washer and spring.

The connector shown on the drawing has an elongated body 10 made of any suitable material. In the example shown, the body consists of two metal plates 12, 14 which are shaped and secured together to form a longitudinal bore in which the screw-threaded shank 18 of a hook or eye 20 is axially movable. Rotation of the shank in the bore is prevented by one or more longitudinal flats or grooves 22 in the shank in which ride bosses 24 or the like within the bore 16.

The bore 16 is intersected by an aperture 26 in which a nut 28 is accommodated, the nut being of cylindrical shape with a knurled outer surface. The nut is in threaded engagement with the shank 18 and is held against axial movement by the ends of the aperture 26. Thus when the nut is turned, the shank 18 which cannot turn is moved axially in one direction or the other to change the overall length of the connector.

To hold the nut 28 against turning when the loom is in operation, the nut is provided with one or more notches 30 in an end thereof, two aligned, radially extending notches being provided in the nut shown on the drawing. A washer 32 is next to the nut and has one or more bosses 34 which are pressed into the notches 30 by a helical spring 36 which is contained in a short enlargement 38 of the bore 16. Two aligned bosses 34 are shown in FIGURE 4 to engage in the notches 30. The engagement of the bosses 34 in the notches 30 effectively holds the nut 28 against rotation except when external torque is applied to the nut as by the fingers of an operator. The sides of the notches 30 and bosses 34 are rounded so that little effort is required of the operator when adjustment is desired. To prevent turning of the washer 32, it is slightly elongated, as shown in FIGURE 4, and is provided with end notches 40 in which engage the inner edges 42 of the body members at the sides of the aperture 26. The washer 32 can thus move axially against the pressure of the spring 36 to permit the rotation of the nut 28 when torque is applied thereto, but without the application of torque, the nut will not turn. A hook or eye 44 is secured to the other end of the body 10.

I claim:
1. A connector for a dobby cord, comprising an elongated body having ends and a longitudinal bore extending inward from one of said ends, said body also having an aperture therethrough intersecting said bore, a hook having a screw-threaded shank axially movable in said bore, means preventing rotative movement of said shank in said bore, a nut in threaded engagement with said shank in said aperture, said nut having a notch in one end thereof, a washer on said shank within said aperture, said washer having a boss adapted to engage in said notch, a coiled spring housed in said body and arranged to press said washer against the notched end of said nut, and means preventing rotative movement of said washer about said shank.

2. A dobby cord connector as described in claim 1, said nut having a knurled outer surface and two aligned radially extending rounded notches in an end thereof, said washer having two bosses adapted to engage in said notches.

References Cited

UNITED STATES PATENTS

| | | | |
|---|---|---|---|
| 1,397,373 | 11/1921 | Gemmer | 287—59 |
| 2,040,790 | 5/1936 | Kaufmann | 139—88 |
| 3,241,574 | 3/1966 | Kramer | 139—88 |

HENRY S. JAUDON, *Primary Examiner.*